Aug. 25, 1953　　　M. E. CHANDLER　　　2,650,050
MOVABLE MOUNT FOR AIRCRAFT ENGINES
Filed June 17, 1948
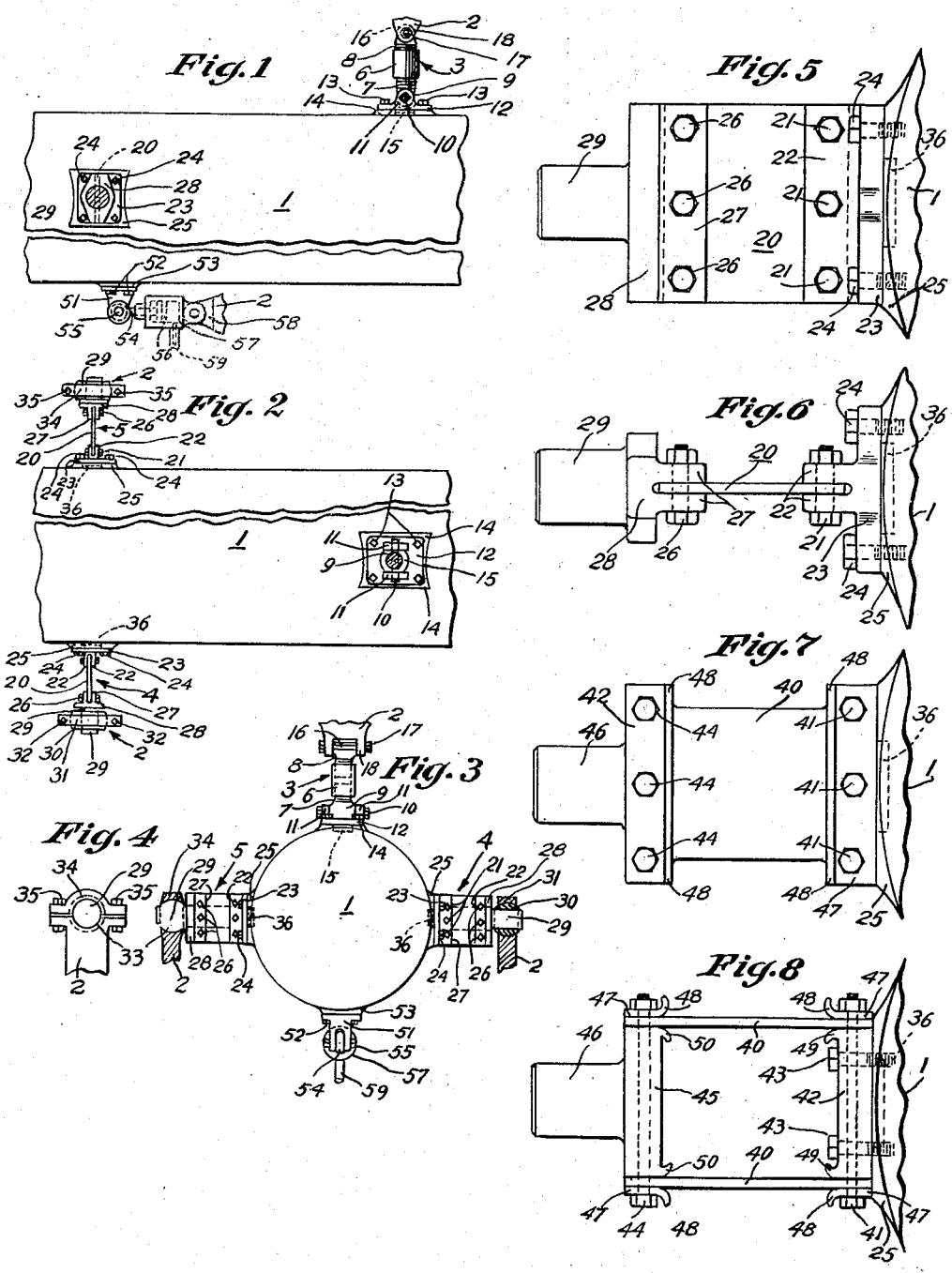
INVENTOR
*Milton E. Chandler*
BY
ATTORNEY Patented Aug. 25, 1953

2,650,050

UNITED STATES PATENT OFFICE 2,650,050

MOVABLE MOUNT FOR AIRCRAFT ENGINES

Milton E. Chandler, New Britain, Conn., assignor to Niles-Bement-Pond Co., West Hartford, Conn., a corporation of New Jersey Application June 17, 1948, Serial No. 33,646

14 Claims. (Cl. 248—5)

This invention pertains to movable mounts for aircraft engines and more particularly has reference to means for mounting aircraft engines of the turbine type in aircraft frames, so as to permit a small longitudinal movement of the engine with reference to the frame, without friction, and at the same time to prevent lateral movement of the engine with reference to the frame.

Heretofore aircraft engines have been rigidly mounted in aircraft frames so as to prevent any movement of the engine with reference to the frame. However, recent developments in aircraft propulsion by turbo-jet and ram jet engines have indicated the great desirability of controlling the speed of flight by means of the thrust of the engine instead of its speed (R. P. M.), and balancing the thrusts of all the engines of a multi-engined aircraft, rather than synchronizing their speeds (R. P. M.'s). One means of accomplishing this method of control is to mount the engines on mounts which will permit a small longitudinal movement of the engines relative to the aircraft frame, in response to the thrusts of the engines, and control the operation of the engines by such relative movement, as disclosed in my copending application, Milton E. Chandler, for Improvements in Jet Engine Control, Serial No. 23,936, filed April 29, 1948, and assigned to the same assignee as this application.

In so mounting aircraft engines, it is desirable that the mounts be as nearly frictionless as possible, so as to involve the minimum power and inertia in their operation. It is also desirable that such movable mounts permit expansion of the engine with rise in temperature without stressing the mounts and all lateral movement of the engine with reference to the aircraft frame be prevented.

It is accordingly an object of this invention to provide means for mounting aircraft engines, particularly those of the turbine type, in the aircraft frame so as to permit a small amount of longitudinal movement of the engine with reference to the frame.

Another object is to provide such a mount in which all friction is eliminated.

Still another object is to provide such a mount in which expansion of the engine with rise in temperature is permitted without producing lateral thrust or stress in the mounts, and in which all lateral movement of the engine with reference to the frame is prevented.

With these and other objects in view which may be incident to my improvements, my invention consists in the combination and arrangement of elements hereinafter described and illustrated in the accompanying drawing in which:

Figure 1 is a partial side elevation, somewhat diagrammatic, of a turbine engine showing my improved mounting means.

Figure 2 is a plan view of the structure shown in Figure 1.

Figure 3 is an end elevation of the structure shown in Figure 1.

Figure 4 is a fragmentary elevation of one of the side mounting means.

Figure 5 is a detail side elevation, on an enlarged scale, of one of the side mounting means shown in Figures 1 and 3.

Figure 6 is a detail plan view, on an enlarged scale, of the mounting means shown in Figure 5.

Figure 7 is a view, similar to Figure 5, of an alternate form of side mounting means.

Figure 8 is a plan view of the mounting means shown in Figure 7.

Referring to Figures 1 to 6 of the drawings, the reference numeral 1 denotes the body of an aircraft engine of the turbine type mounted in the frame of the aircraft of which the reference numeral 2 denotes generally those parts of the frame adjacent the engine and to which my improved engine mounting means is attached. This mounting means is a three point suspension consisting generally of one forward support 3, by which the top of the body 1 is hung from an overlying part of the aircraft frame 2, and two rear supports 4 and 5, by which the sides of the body 1 are attached to adjacent portions of the frame 2.

The forward support 3 is in the form of an adjustable pivoted link which consists of an internally threaded sleeve 6 which engages two opposed, externally threaded rods 7 and 8. The lower end of rod 7 terminates in a horizontal bearing sleeve 9, rotatably mounted upon a bearing pin 10, journalled in two lugs 11 of a base plate 12 which is secured by tap bolts 13 to a top support pad 14, integral with the body 1 of the engine. Projecting from the bottom of base plate 12 is a flat cylindrical boss 15 which fits snugly in a matching recess in support pad 14 and serves to transmit longitudinal thrust from engine body 1 to base plate 12.

The upper end of rod 8 terminates in a horizontal bearing sleeve 16, mounted rotatably upon a bearing pin 17 which is journalled in two lugs 18, integral with aircraft frame 2.

From the foregoing description it is clear that forward support 3 permits engine body 1 to move to a limited extent in a direction parallel to the longitudinal axes of the engine and aircraft frame, and the distance between the bearing pins 10 and 17 can be adjusted by turning sleeve 6 on rods 7 and 8. At the same time, the snug fit of bearing sleeves 9 and 16 between lugs 11 and 18, respectively, prevents any bodily lateral movement of the forward part of the engine body 1 with reference to frame 2.

Each side support 4 and 5 is in the form of a flexible-webbed link, one end of which is rigidly attached to the body 1 of the engine, and the other end rigidly attached to the aircraft frame 2, so that the body 1 may move to a limited extent in a direction parallel to the longitudinal axes of the engine and frame by flexing the webs of supports 4 and 5.

Each support 4 and 5 consists of a resilient metal plate 20, secured at its inner end by bolts 21 between the flanges 22 of a base plate 23 which is in turn fixed by tap bolts 24 to a side support pad 25, integral with body 1 of the engine. The outer end of plate 20 is similarly secured by bolts 26 between the flanges 27 of a shoe 28 having an integral, outwardly projecting bearing 29 which, in the case of support 4, is slidably mounted in a journal ring 30, rigidly supported by frame 2 and held in place by a yoke 31 and bolts 32. In the case of support 5, the bearing 29 is of arcuate shape and is fixedly mounted in a similar shaped bearing 33, integral with frame 2, and is held in place by a yoke 34 and bolts 35. Each base plate 23 has a flat cylindrical projection 36 which fits snugly into a matching recess in each support pad 25 and serves to transmit longitudinal thrust from engine body 1 to each base plate 23.

Referring now to Figures 7 and 8, there is shown an alternate form of side support 4 and 5 in which two similarly shaped resilient metal plates 40 replace the single plate 20 of the form of support shown in Figures 1-6. The inner end of each plate 40 is secured by bolts 41 to a base plate 42 which is in turn attached by tap bolts 43 to side support pad 25 on engine body 1. The outer end of each plate 40 is similarly secured by bolts 44 to shoe 45 which is supported by an integral outwardly projecting bearing 46, corresponding to the bearing 29 of the support shown in Figures 1 to 6. Interposed between the inner and outer ends of each plate 40 and the heads and nuts of bolts 41 and 44 respectively, are four identical reinforcing plates 47, each of which is provided with an outwardly extending curved flange 48, disposed opposite to similar flanges 49 on base plate 42 and 50 on shoe 45. The purpose of plates 47 and curved flanges 48, 49 and 50 is to permit plates 40 to bend in flexure without causing high localized stresses in the areas immediately adjacent those in contact with base plate 42 and shoe 45. If it is desired to have more than 2 plates 40 in each side support 4 and 5, it is obvious that base plates 42 and shoes 45 of Figures 7 and 8, could each be replaced by two half-length base plates and two half-length shoes, with a third plate 20 interposed between the adjacent ends of the half-length base plates and shoes, without otherwise changing the construction of the side supports 4 and 5.

Practically the only difference in action between the single plate side supports 4 and 5 shown in Figures 1 to 6 and the double plate side support, shown in Figures 6 and 7, is that for a given longitudinal thrust, the amount of deflection of the latter is approximately half of that of the former, if each plate 20 or 40 is of substantially the same dimensions and modulus of elasticity. This may be preferred where it is desired to reduce the amount of longitudinal movement of the engine, with reference to the aircraft frame, for any given thrust of the engine, especially when the thrust is large.

In the system of controlling the operation of the engine by its thrust, through the movement of the engine in response to its thrust, it is necessary to oppose the thrust of the engine by a recoil mechanism which actuates an element of the control system by the movement of the engine, as disclosed in my copending application cited in column 1. For this purpose, a bifurcated lug 51 is attached by tap bolts 52 to a mounting pad 53 on the under side of engine body 1 (see Figures 1 and 3). Between the arms of lug 51 is journalled a piston rod 54 on a bearing pin 55. A piston 56, attached to the other end of rod 54, is slidably mountd in a recoil cylinder 57 which is pivotally mounted on a bracket 58 of the aircraft frame 2. The right end of cylinder 57 is supplied with liquid through a conduit 59 which communicates with a movable element in the engine control system (not shown) and actuates this element by variations in pressure of the liquid in cylinder 57 due to the movement of engine body 1 in response to engine thrust.

From the foregoing description it is clear that when the engine is in operation, the discharge of exhaust gases to the left in Figures 1 and 2 will exert a thrust on the engine and move it to the right relative to frame 2, by virtue of the rotation of link 3 on its bearing pin 17, and the bending of resilient plates 20 in side supports 4 and 5, and the amount of said movement will be proportional to the amount of said thrust. It is also apparent that while plates 20 are free to bend in direction parallel to the longitudinal axis of the engine, the rigid attachment of plates 20 to engine body 1 and frame 2 in side support 5 will prevent any bodily lateral movement of the engine with reference to the frame. At the same time, since the bearing 29 of support 4 is slidably mounted in frame 2, and a small clearance is left between the outer end of shoe 28 and fixed journal ring 30 (see Figures 1 and 3), any diametral expansion of the engine body 1 due to rise in temperature is accommodated by a corresponding movement of bearing 29 in ring 30.

Also, since plates 20 are never stressed beyond their elastic limits when bending in response to engine thrust, they constitute frictionless bearings and involve no loss of power or inertia in their operation. Where adjustability is not necessary, the forward support 3 may take the form of side supports 4 and 5.

While I have shown and described the preferred embodiment of my invention, I do not limit my invention to the constructional details disclosed by way of illustration, as these may be changed and modified by those skilled in the art without departing from the spirit of my invention or exceeding the scope of the appended claims.

I claim:

1. In an aircraft propelled by a jet engine, a frame, means for mounting said engine movably lengthwise in said frame in a line parallel to the direction of flight of said aircraft, comprising a plurality of resilient, flexible elements connecting said engine with said frame, said elements being so constructed and arranged that the engine is bodily movable relative to said frame in said lengthwise direction, but is prevented from rotation and lateral bodily movement with reference to said frame.

2. A mounting means according to claim 1, wherein said resilient elements are so constructed and arranged that they oppose the lengthwise bodily movement of the engine, without friction, by bending of said resilient elements.

3. A mounting means according to claim 1, including means for preventing the diametral expansion of the engine caused by rise in temperature from imparting lateral thrust to said frame.

4. A mounting means according to claim 1 wherein said resilient elements are so constructed and arranged that they oppose the lengthwise bodily movement of the engine by a beam bending action which develops an opposing force proportional to the extent of said movement.

5. A mounting means according to claim 1, having an additional adjusting means connecting the engine to said frame.

6. A mounting means according to claim 1, in which one or more of said connecting elements include a flexible, resilient web member.

7. A mounting means according to claim 6 in which each web member is disposed at right angles to the lengthwise axes of the engine and frame.

8. A mounting means according to claim 6 in which each web member is fixed at its opposite ends to a sidewall of the engine and to the frame, respectively.

9. A mounting means according to claim 1, in which each of said connecting elements constitutes a side support for the engine, and each of which includes a plurality of flexible, resilient web members rigidly attached to a side of the engine.

10. A mounting means according to claim 9 in which said web members are parallel to each other and at a fixed distance apart.

11. A mounting means according to claim 10 in which said web members are disposed at right angles to the lengthwise axes of the engine and frame.

12. A mounting means according to claim 11 in which said web members are rigidly fixed at their opposite ends to the engine and frame, respectively.

13. A mounting means according to claim 12, including means for preventing high localized stresses in said web members when they are flexed by the movement of the engine.

14. A mounting means according to claim 13 in which said last mentioned means comprises connecting spacers between said web means, and reinforcing plates connected to said web members and contacting portions of the outside faces of said members, said spacers and plates having curved flanges which are adapted to contact said members and limit the flexing thereof.

MILTON E. CHANDLER.

References Cited in the file of this patent

UNITED STATES PATENTS

| Number | Name | Date |
| --- | --- | --- |
| 1,000,494 | Clement | Aug. 15, 1911 |
| 1,723,763 | Burnelli | Aug. 6, 1929 |
| 1,757,343 | Steinmuller | May 6, 1930 |
| 2,344,735 | Rockwell | Mar. 21, 1944 |
| 2,379,315 | Moorehead | June 26, 1945 |
| 2,393,141 | Butterfield | Jan. 15, 1946 |
| 2,400,248 | Morgan | May 14, 1946 |
| 2,457,425 | Wolford | Dec. 28, 1948 |